(12) United States Patent
Shirahatti et al.

(10) Patent No.: US 11,747,441 B2
(45) Date of Patent: Sep. 5, 2023

(54) INDOOR/OUTDOOR DETECTION USING WIRELESS SIGNALS

(71) Applicant: Apple Inc., Cupertino, CA (US)

(72) Inventors: Harsha Shirahatti, Santa Clara, CA (US); Sujeet Milind Patole, Cupertino, CA (US); Jouya Jadidian, Los Gatos, CA (US); Mikheil Tsiklauri, San Jose, CA (US); Shun Liu, Cupertino, CA (US); Vaneet Pathak, Los Altos, CA (US); Lei Wang, Santa Clara, CA (US); Kumar Gaurav Chhokra, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 312 days.

(21) Appl. No.: 16/941,810

(22) Filed: Jul. 29, 2020

(65) Prior Publication Data

US 2022/0035001 A1 Feb. 3, 2022

(51) Int. Cl.
*G01S 7/41* (2006.01)
*G01C 25/00* (2006.01)
*G01C 5/06* (2006.01)
*G01S 13/08* (2006.01)

(52) U.S. Cl.
CPC ............... *G01S 7/412* (2013.01); *G01C 5/06* (2013.01); *G01C 25/00* (2013.01); *G01S 13/08* (2013.01)

(58) Field of Classification Search
None
See application file for complete search history.

(56) References Cited

U.S. PATENT DOCUMENTS

| 8,972,180 B1* | 3/2015 | Zhao | G01C 21/165 |
| | | | 701/468 |
| 2013/0157638 A1* | 6/2013 | Malmbak | H04W 4/025 |
| | | | 455/418 |
| 2015/0207234 A1* | 7/2015 | Ganchrow | H01Q 9/30 |
| | | | 343/893 |

(Continued)

FOREIGN PATENT DOCUMENTS

CN 106646396 A * 5/2017 ........... G01S 7/2927

OTHER PUBLICATIONS

F. Yin, Y. Zhao, F. Gunnarsson and F. Gustafsson, "Received-Signal-Strength Threshold Optimization Using Gaussian Processes," in IEEE Transactions on Signal Processing, vol. 65, No. 8, pp. 2164-2177, Apr. 15, 2017 (Year: 2017).*

(Continued)

*Primary Examiner* — Timothy A Brainard
*Assistant Examiner* — Hailey R Le
(74) *Attorney, Agent, or Firm* — Fletcher Yoder, P.C.

(57) ABSTRACT

An electronic device may utilize various methods or systems to determine whether the electronic device is indoors or outdoors. The electronic device transmits wireless signals (e.g., radio detection and ranging (RADAR) signals). The electronic device receives reflections of the wireless signals. Using these received reflections of the wireless signals, the electronic device determines whether a power amplitude of the reflections is greater than or equal to a threshold value. In response to a determination that the power amplitude is not greater than or equal to the threshold value, the electronic device operates in an outdoor mode or an indoor mode.

20 Claims, 8 Drawing Sheets

(56) References Cited

U.S. PATENT DOCUMENTS

| | | | |
|---|---|---|---|
| 2015/0228077 A1* | 8/2015 | Menashe | G06T 7/97 |
| | | | 382/103 |
| 2017/0078956 A1* | 3/2017 | LeBlanc | H04L 45/70 |
| 2017/0238147 A1* | 8/2017 | Dechu | G06V 20/10 |
| | | | 455/456.1 |
| 2020/0066236 A1* | 2/2020 | Giusti | G01S 13/42 |
| 2020/0210430 A1* | 7/2020 | Shen | G06F 16/221 |
| 2020/0309940 A1* | 10/2020 | Zhao | G01S 13/62 |
| 2021/0141082 A1* | 5/2021 | Moshe | G06K 9/627 |
| 2021/0199791 A1* | 7/2021 | Podkamien | B60C 23/067 |
| 2022/0155880 A1* | 5/2022 | Martin | G06F 3/0346 |

OTHER PUBLICATIONS

Leverege. (Feb. 5, 2019). Indoor positioning with ultrasonic/ultrasound. IoT For All. Retrieved Nov. 28, 2022, from https://www.iotforall.com/indoor-positioning-ultrasonic-ultrasound (Year: 2019).*

Imran Ashraf, et al., "Floor Identification Using Magnetic Field Data with Smartphone Sensors", Sensors MDPI, Published: Jun. 3, 2019, 23 pages.

Chungheon Yi, et al., "Pressure-Pair-Based Floor Localization System Using Barometric Sensors on Smartphones", Sensors MDPI, Published: Aug. 20, 2019, 18 pages.

* cited by examiner

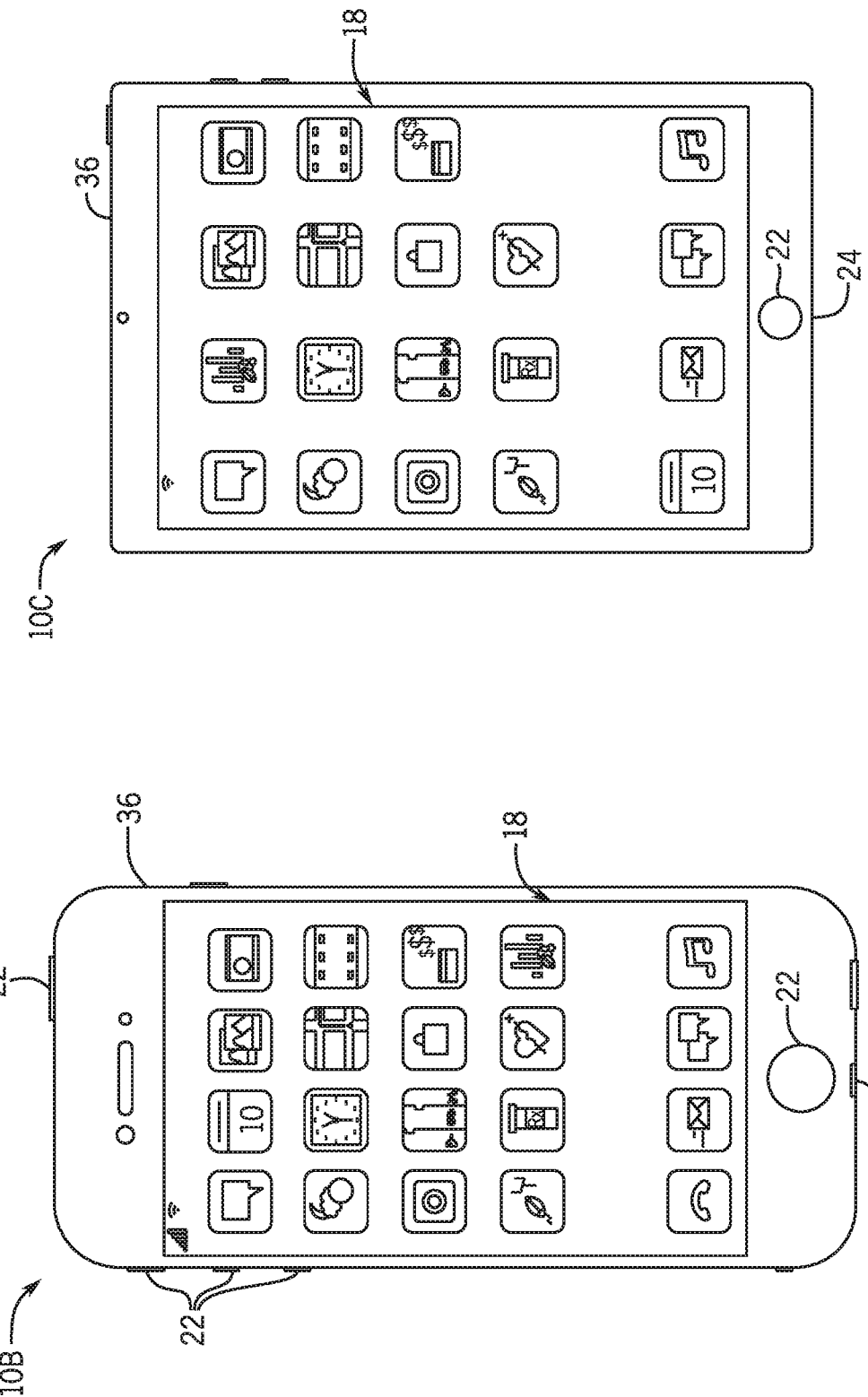

INDOOR/OUTDOOR DETECTION USING WIRELESS SIGNALS

BACKGROUND

The present disclosure relates generally to wireless electronic devices, and more particularly, to using wireless electronic devices to perform mapping of whether the electronic devices are indoor or outdoor.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices may be used to perform a variety of operations such as altitude determination and/or location services. However, the accuracy of the results of the operations may vary depending on whether the electronic devices are indoors or outdoors. Some electronic devices may use global positioning systems (GPS) signals to determine a location of the respective electronic devices and/or determine whether the respective electronic devices are indoors or outdoors. Generally, when the electronic devices are indoors, the electronic devices may not receive GPS signals. However, using GPS signals as indications of the electronic devices as being inside may lead to falsely determining that the electronic devices are indoors when the electronic devices are outdoors and/or falsely determining that the electronic devices are outdoors when they are actually indoors. For instance, since GPS signals may pass through windows, an electronic device may receive GPS signals and improperly determine that it is outdoors when the electronic device is located near a window. Similarly, when an electronic device is outdoors but between tall buildings, the electronic device may not receive GPS signals and may improperly determine that the electronic device is indoors. When the electronic devices rely on these improper indoor/outdoor determinations, the operations using the indoor/outdoor determinations may function improperly and/or using the wrong settings.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Electronic devices may utilize an indoor status or outdoor status to perform a variety of operations using respective settings. To increase reliability of these processes, an electronic device may predict whether the electronic device is indoors or outdoors before performing the operations. To perform such predictions, the electronic device may transmit ranging signals in an upward direction toward a ceiling. Any reflected signals from the upward direction may be analyzed to determine whether the electronic device is indoors or outdoors by comparing the power amplitudes of the reflected signals to a threshold. The threshold may be determined by testing multiple thresholds versus an actual status to determine an overall accuracy of each of the thresholds. Additionally or alternatively, the actual status may be estimated using one or more other methods, such as user input, GPS location, strength of received wireless signals (e.g., cellular or Wi-Fi signals), and/or other factors that may indicate whether the electronic device is indoors. The threshold may be selected from the multiple thresholds based on the overall accuracies of the thresholds. For example, a threshold with the highest accuracy may be selected as the threshold to be used for future predictions.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 3 is a front view of a hand-held device representing another embodiment of the electronic device of FIG. 1, in accordance with an embodiment of the disclosure;

FIG. 4 is a front view of another hand-held device representing another embodiment of the electronic device of FIG. 1, in accordance with an embodiment of the disclosure;

DETAILED DESCRIPTION

Figure 1:
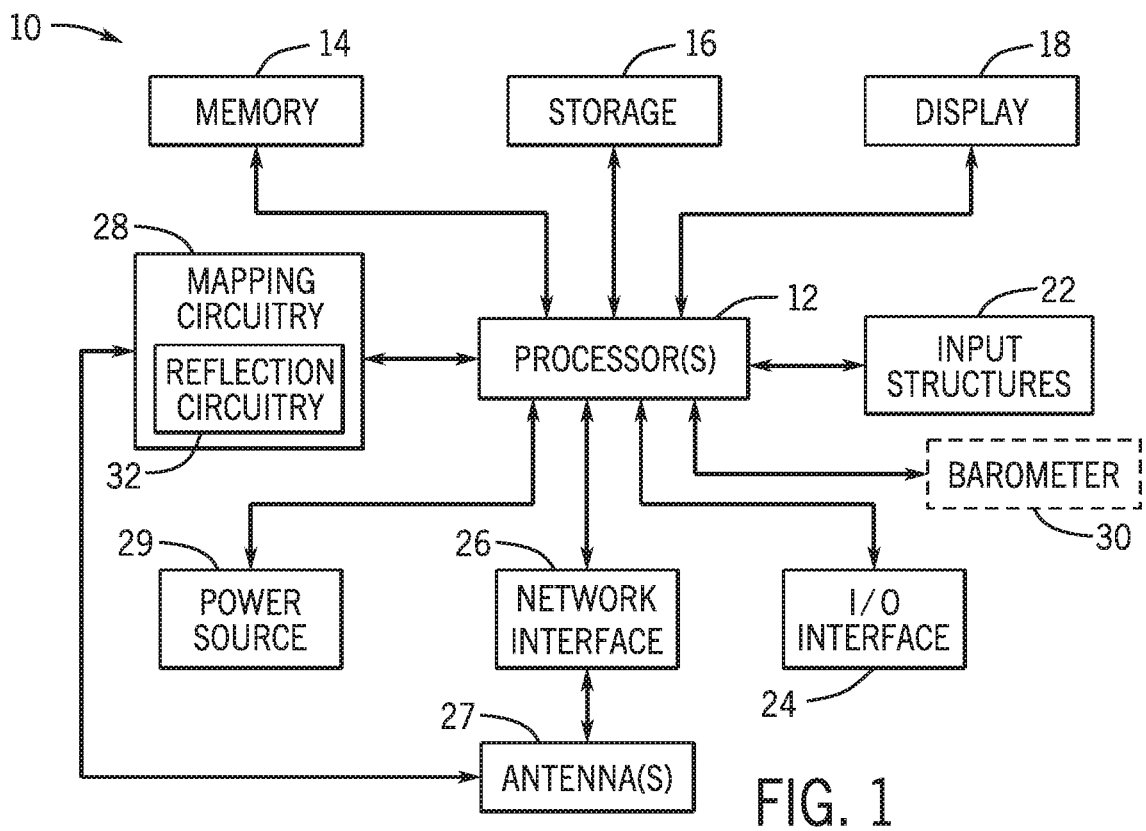
FIG. 1 is a schematic block diagram of an electronic device including mapping circuitry, in accordance with an embodiment of the disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure generally relate to determining whether an electronic device is indoors or outdoors based on wireless signals. For instance, the wireless signals may include radio ranging and detection (RADAR) signals. The electronic devices may utilize a reflected power amplitude (i.e., power level) to determine an object (e.g., a wall, ceiling, or floor). This information, combined with an orientation of the electronic device, may be used to determine whether a ceiling object is located within an expected distance of a ceiling by determining whether the reflected power amplitude of the wireless signal exceeds a threshold. Thus, using the reflected power amplitude, the electronic device may determine whether the electronic device is under a roof/ceiling. This information may be used to determine whether the device is indoors with more reliability than is available using GPS signals. Furthermore, in some embodiments, information from multiple directions may be used to confirm whether the electronic device is indoors. For example, if one or two walls are detected in addition to the ceiling, the electronic device is more likely to be indoors. Furthermore, information from one or more other sensing units (e.g., motion detection) in the electronic device may be used to confirm whether the electronic device is indoors or outdoors.

As will be discussed below, the threshold for the reflected power amplitude may be determined empirically. For example, thresholds may be determined using multiple measurements at multiple distances organized into bins. For potential thresholds, results of whether an estimation that the electronic device is indoors may be tested at the multiple distances and organized into bins. In each of the bins, the accuracy of the estimation may be stored in the bins by comparing the estimation to whether the electronic device is actually indoors. This determination may be manually entered, using location-based determinations, strength of cellular signals, and/or other suitable methods. The accuracy of each of the bins may be combined into an overall accuracy value for a particular threshold. A threshold may be selected from the multiple thresholds based on the overall accuracy. For example, the highest accuracy may be used as the selected threshold. In some embodiments, the combination into the overall accuracy may include summing all of the bins for the specific threshold. In some embodiments, the combination may include weighting bins more likely to be in a ceiling distance (e.g., 1-2.5 m) higher in the summation than other distances. Additionally or alternatively, multiple measurements over a period of time in a sliding window may be averaged to estimate whether the electronic device is indoors.

With the foregoing in mind, a general description of suitable electronic devices that may be useful in performing magneto-inductive charging and communication in the absence of a cellular and/or internet network connection will be provided below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, network interfaces 26, antenna(s) 27, mapping circuitry 28, and a power source 29. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
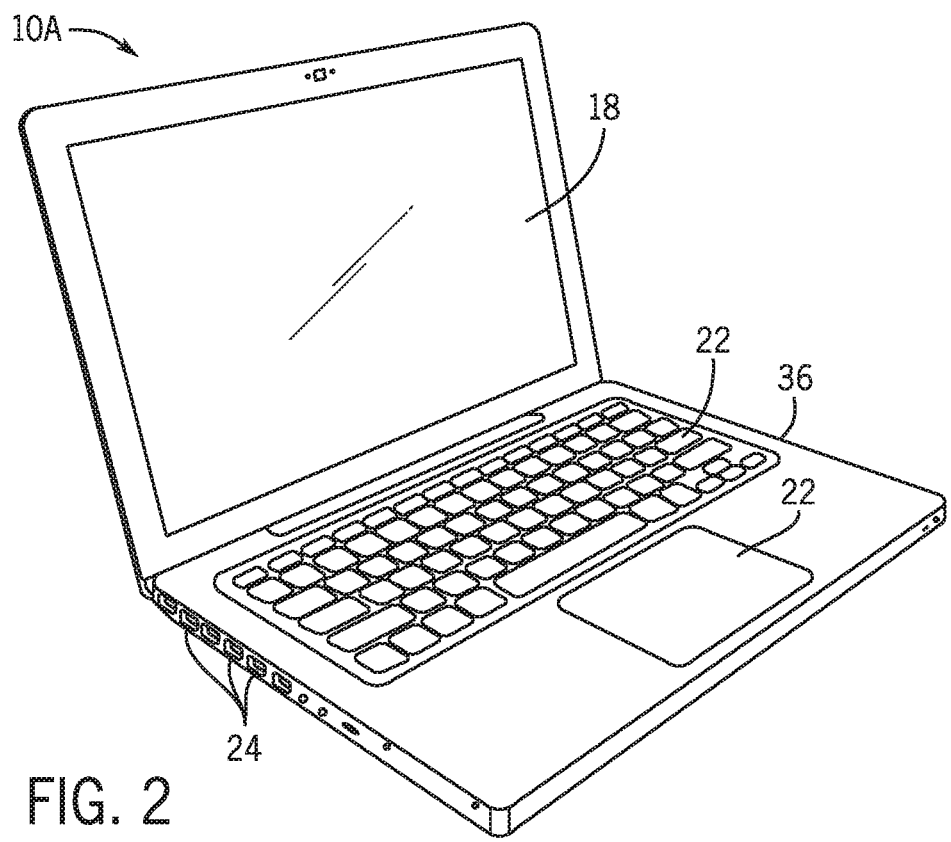
FIG. 2 is a perspective view of a notebook computer representing an embodiment of the electronic device of FIG. 1, in accordance with an embodiment.
Figure 5:
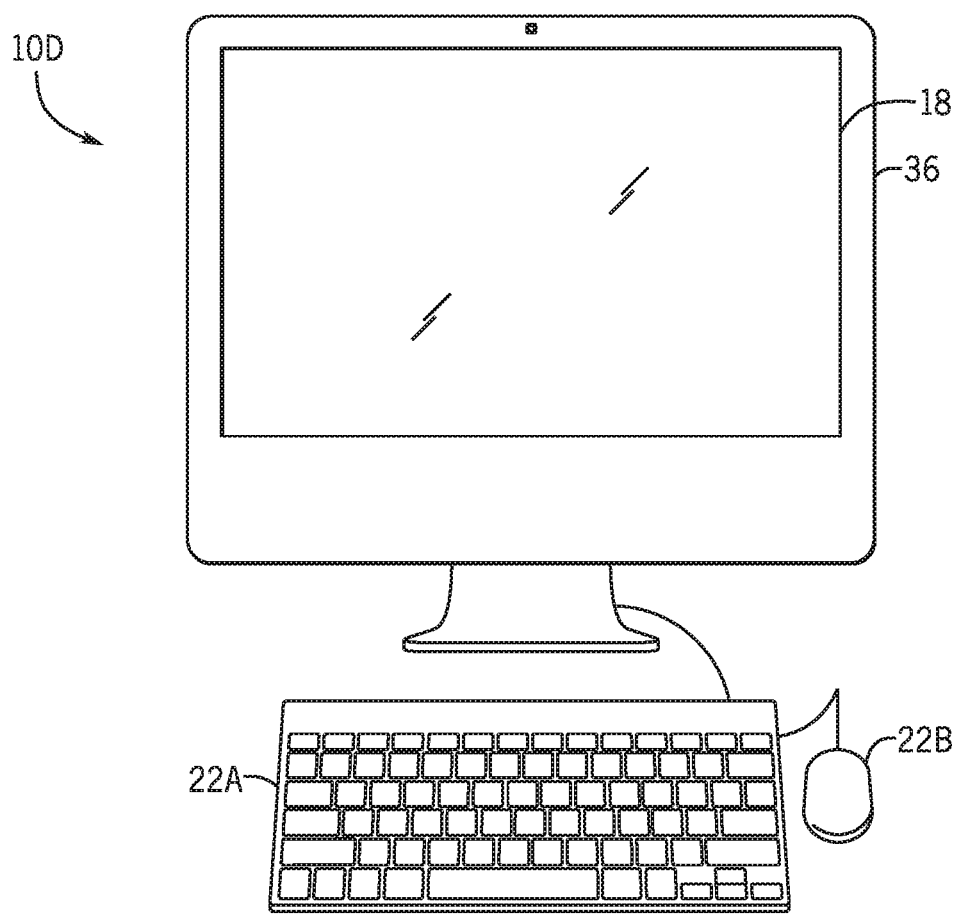
FIG. 5 is a front view of a desktop computer representing another embodiment of the electronic device of FIG. 1, in accordance with an embodiment of the disclosure.
Figure 6:
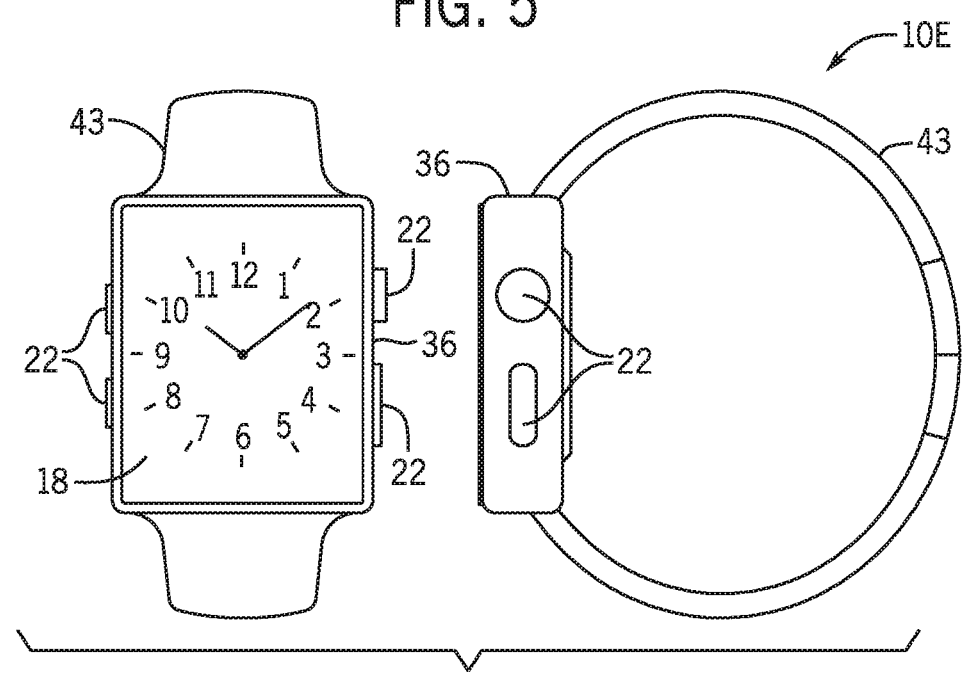
FIG. 6 is a front view and side view of a wearable electronic device representing another embodiment of the electronic device of FIG. 1, in accordance with an embodiment of the disclosure.

By way of example, the electronic device 10 may represent a block diagram of a notebook computer depicted in FIG. 2, a handheld device depicted in FIG. 3, a handheld device depicted in FIG. 4, a desktop computer depicted in FIG. 5, a wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a $3^{rd}$ generation (3G) cellular network, 4th generation (4G) cellular network, long term evolution (LTE) cellular network, or long term evolution license assisted access (LTE-LAA) cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth. For wireless communications, the network interfaces 26 may utilize one or more antenna(s) 27.

In certain embodiments, the electronic device 10 may include mapping circuitry 28 that may be used to map whether the electronic device 10 is indoors or outdoors. This determination may be used to determine how to perform various operations. For example, in an altitude detection or height estimation operation, the electronic device 10 may use a barometer 30 and Wi-Fi signals to determine a height of an electronic device 10. The barometer 30 is used to measure pressure changes as an electronic device 10 ascends or descends. The barometer 30 uses calibrations to ensure accuracy. The calibrations may use an outdoor environment to calibrate baseline values for a particular location. For instance, when outside, the electronic device 10 may assume that the electronic device 10 is at a ground level. Additionally or alternatively, the electronic device 10 may calibrate the barometer 30 using outdoor settings based on weather patterns/conditions while using indoor settings when the electronic device 10 is indoors. However, unreliable methods of indoor/outdoor detection may result in incorrect calibration causing height estimations to be inaccurate. These height estimation failures may cause an electronic device to fail to meet safety standards requiring a specific vertical accuracy. For example, new Federal Communications Commission (FCC) may require a specific height estimation accuracy (e.g., +/−3 m) for cellular calls using emergency services, such as 911 emergency calls that may not be met with inaccurate barometer 30 calibrations due to incorrect indoor/outdoor determinations.

Furthermore, accurate indoor/outdoor determinations may be useful for a large variety of applications. For instance, Wi-Fi (and/or other wireless network) signals may be weak with poor transfer rates after an electronic device 10 has moved outside of a house or other building where an access point for the network is located. In some situations (e.g., when a setting is selected for a particular network), the electronic device 10 may disconnect from the Wi-Fi network once the electronic device 10 is determined to be outdoors rather than rely on weak Wi-Fi signals outside of the house or building. Furthermore, by switching to a cellular network outside and to the Wi-Fi wireless network inside, the relatively high energy cost of using the cellular network inside the building may be avoided without experiencing loss of connectivity/speed when the electronic device 10 is outdoors.

Similarly, accurate indoor/outdoor determinations may enable the electronic device 10 to less power by using Wi-Fi signals while the electronic device 10 is indoors. Specifically, accurate determinations that the electronic device 10 is indoors may enable the electronic device 10 to disable GPS usage and attempt to use lower-power Wi-Fi location determinations while indoors since GPS signals may not reach the electronic device 10 when the electronic device 10 is indoors.

Other location-based services may further be fine-tuned based on an indication of whether the electronic device 10 is indoors or outdoors. For example, an electronic device 10 may play audio through a first wireless speaker when the electronic device 10 is indoors and a second wireless speaker when the electronic device 10 is outdoors.

To increase accuracy of the indoor/outdoor determination, the mapping circuitry 28 includes and/or uses reflection circuitry 32 to emit and/or receive wireless signals and determine a reflected power amplitude as an indication of whether the electronic device 10 is indoors or outdoors. For instance, the reflection circuitry 32 may utilize radio ranging and detection (RADAR) signal or other wireless signals using other ranging protocols. To use one or more ranging signal types, the reflection circuitry 32 may include and/or use ranging generation and/or process circuitries for the corresponding ranging signal types. In some embodiments, the reflection circuitry 32 may include standalone RADAR (or other ranging) circuitry that may include standalone sensors added to the electronic device 10.

Regardless of ranging signal type used, the mapping circuitry 28 uses the reflected power amplitude to determine whether a ceiling (and/or walls) are likely present. The mapping circuitry 28 uses such determinations to predict whether the electronic device 10 is indoors or is outdoors. The reflection circuitry 32 may utilize and/or be at least partially implemented in the antenna(s) 27 that are used to communicate via the network interface 26. In some embodiments, at least a portion of the functionality discussed in reference to the mapping circuitry 28 and/or the reflection circuitry 32 may be performed by the processor(s) 12.

In some embodiments, the mapping circuitry 28 may use measurements from other position and/or pressure sensors in the electronic device 10 to supplement a determination an indoor/outdoor determination made using the reflection circuitry 32. For instance, the indoor/outdoor determination may supplemented and/or confirmed using heuristics based on other types of sensing in the electronic device 10, such as the barometer 30, an inertial measurement unit (IMU) as part of the input structures 22, time of flight sensors, strength of signal measurements, GPS or other wireless-based location determinations, manual inputs, and/or other measurements that may be used to deduce that the electronic device 10 is indoors/outdoors. As an example, the electronic device 10 may utilize different classifiers for the indoor/outdoor mapping using the reflection circuitry 32 based on whether the IMU determines that the electronic device 10 is moving or stationary. When the electronic device 10 is in motion, the indoor/outdoor mapping determination may be made more frequently and/or with more intensity/power when compared to the same determination when the electronic device 10 is stationary.

Additionally or alternatively, the IMU may be used to determine which direction to scan for a ceiling direction to determine whether the electronic device 10 is indoors. The data from multiple sensors may be combined using a Kalman filter to enhance reliability of the determination. Additionally or alternatively, repeated testing and/or machine learning may be used to determine an accurate method for combining the results from the multiple sensors.

As further illustrated, the electronic device 10 may include a power source 29. The power source 29 may include any suitable source of power, such as a rechargeable lithium polymer (Li-poly) battery and/or an alternating current (AC) power converter.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a $3^{rd}$ generation (3G) cellular network, $4^{th}$ generation (4G) cellular network, $5^{th}$ generation (5G) cellular network, long term evolution (LTE) cellular network, or long term evolution license assisted access (LTE-LAA) cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth.

In certain embodiments, to allow the electronic device 10 to communicate over the aforementioned wireless networks (e.g., Wi-Fi, WiMAX, mobile WiMAX, 4G, LTE, and so forth), the electronic device 10 may include the antenna 27 and accompanying circuitry (e.g., a transceiver). The antenna 27 may include any circuitry that may be useful in both wirelessly receiving and wirelessly transmitting signals (e.g., data signals).

For example, the antenna 27 may transmit and receive signals (e.g., data symbols) to support data communication in wireless applications such as, for example, PAN networks (e.g., Bluetooth), WLAN networks (e.g., 802.11x Wi-Fi), WAN networks (e.g., 3G, 4G, and LTE and LTE-LAA cellular networks), WiMAX networks, mobile WiMAX networks, ADSL and VDSL networks, DVB-T and DVB-H networks, UWB networks, and so forth. As further illustrated, the electronic device 10 may include a power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, Calif. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hard wired connection for charging and/or content manipulation using a standard connector and protocol, such as the Lightning connector provided by Apple Inc., a universal service bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook® available from Apple Inc., or other similar device. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
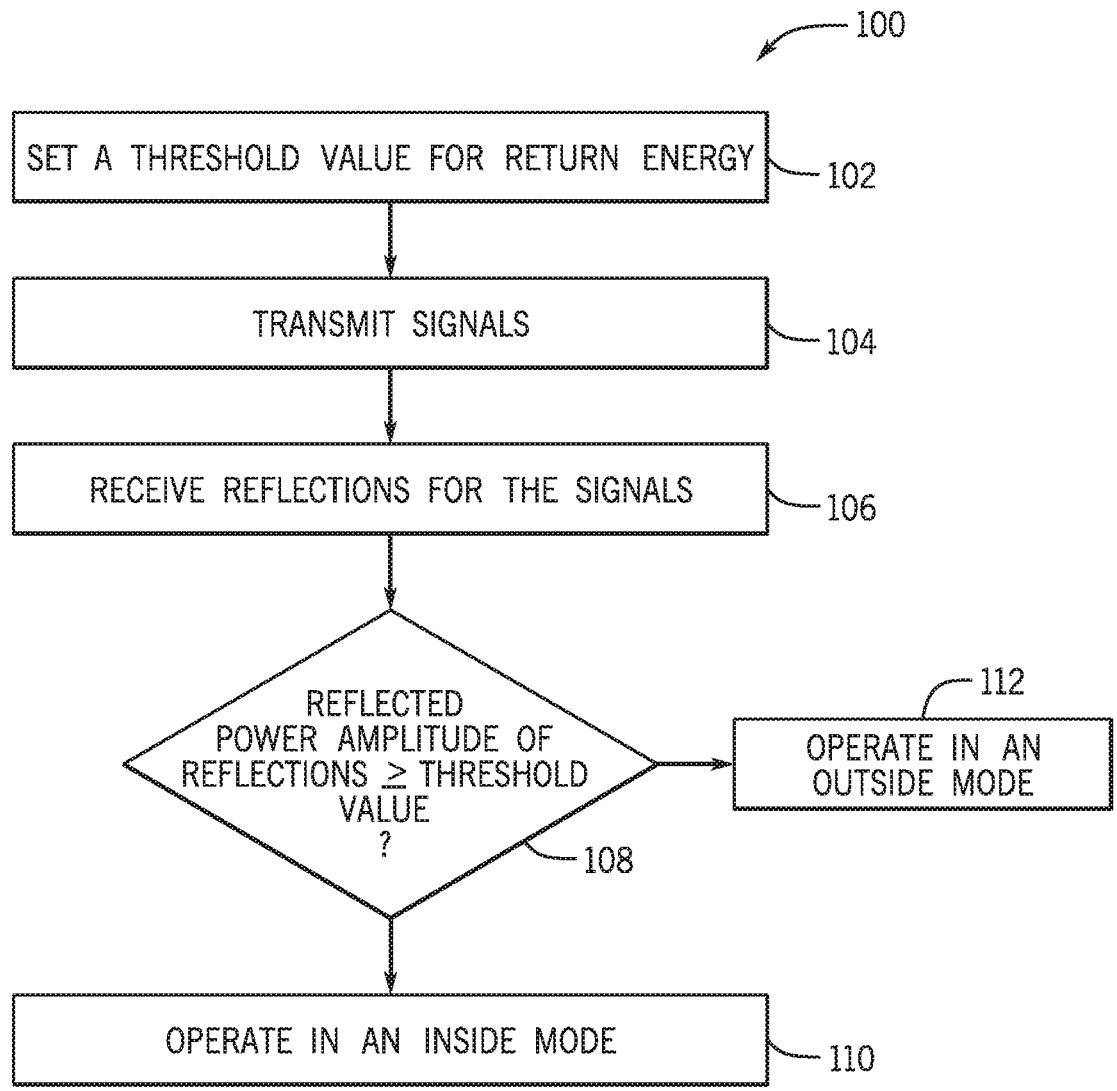
FIG. 7 is a block diagram of a process for predicting whether the electronic device of FIG. 1 is indoors using the mapping circuitry and power amplitudes of reflected signals, in accordance with an embodiment of the disclosure.

FIG. 7 is a flowchart of an embodiment of a process 100 that may be used to perform indoor/outdoor determinations in accordance with the teachings herein. The mapping circuitry 28 sets a threshold value for return energy received back at the electronic device 10 (block 102). As discussed below, in some embodiments, the threshold may be set by empirically testing multiple thresholds and selecting a threshold based on determined accuracies of the thresholds. Additionally or alternatively, the threshold may be set using a calculation of an expected amount of power amplitude of the reflected signals, and/or the threshold may be set to a default value or an input of a value. This amplitude may be expressed as the square root of the squares of an in-phase power and a quadrature-phase power.

The reflection circuitry 32 transmit signals (block 104). As previously noted, the signals may include RADAR signals or other wireless signals that may be used for ranging. The reflection circuitry 32 may transmit the signals via the antenna(s) 27, dedicated circuitry (e.g., RADAR sensors), and/or other portions of the electronic device 10. The reflection circuitry 32 may cause the signals to be transmitted in a direction that the electronic device 10 has determined to be directed to where a ceiling (e.g., vertically above the electronic device 10) would be if the electronic device 10 is indoors. This direction may be determined using other input structures 22, such as orientation-based sensor(s). In addition to or alternative to the signals directed toward a possible ceiling location, the electronic device 10 may direct signals towards expected wall locations (e.g., horizontally from the electronic device 10) and/or the floor (e.g., vertically below the electronic device 10). In some embodiments, the electronic device 10 may broadcast in more than one direction (e.g., 4 directions) and use a furthest distance (e.g., lower power amplitude) as the ceiling location.

The reflection circuitry 32 receives reflections for the transmitted signals after they have been reflected by a surface (e.g., wall, ceiling, or floor) after transmission from the electronic device (block 106). The reflection circuitry 32 may receive the reflected signals from the antenna(s) 27 and/or dedicated receiving sensors (e.g., RADAR sensors).

The mapping circuitry 28 then determines whether the power amplitude of the reflections are greater than or equal to the threshold (block 108). Additionally or alternatively, parameters other than the power amplitude may be used and compared to a respective threshold for the indoor determination. For example, a time-of-flight of the reflected signals may be used to determine proximity to the ceiling for a determination whether the electronic device 10 is indoors. If the power amplitude is greater than or equal to the threshold, the electronic device operates in an indoor or inside mode (block 110). For example, height estimation may use indoor settings, specified indoor network connections (e.g., Wi-Fi network) may be used to send and/or receive data, indoor speakers may be used, GPS may be disabled, halt barometer 30 calibration, and/or other settings may be set according to the electronic device 10 being indoors.

If the power amplitude is below the threshold, the electronic device 10 may operate in an outside or outdoor mode (block 112). For example, the electronic device 10 may initiate a calibration of the barometer 30, may perform height estimation using outdoor settings, using specified outdoor network connections (e.g., cellular network) to send and/or receive data, may use outdoor speakers, may enable GPS, may disable Wi-Fi, and/or other settings may be set according to the electronic device 10 being indoors.

As previously noted, to account for different orientations of the electronic device 10, the electronic device 10 may include multiple RADAR sensors (or other ranging mechanisms) to capture surrounding reflections. These RADAR sensors may have overlapping or non-overlapping field of views depending on antenna implementation. In some embodiments, the sensors used for ranging may be shared with communications systems (e.g., the antenna(s) 27 and the network interface 26). The RADAR sensors may share a clock to enable the RADAR sensors to implement beamforming and/or super-resolution techniques for improving resolution and a signal-to-noise ratio. In implementations where the RADAR sensors do not share a clock, a system-level resource, such as a time stamp, may be used to synchronize output of the RADAR sensors at the operating system level.

Figure 8:
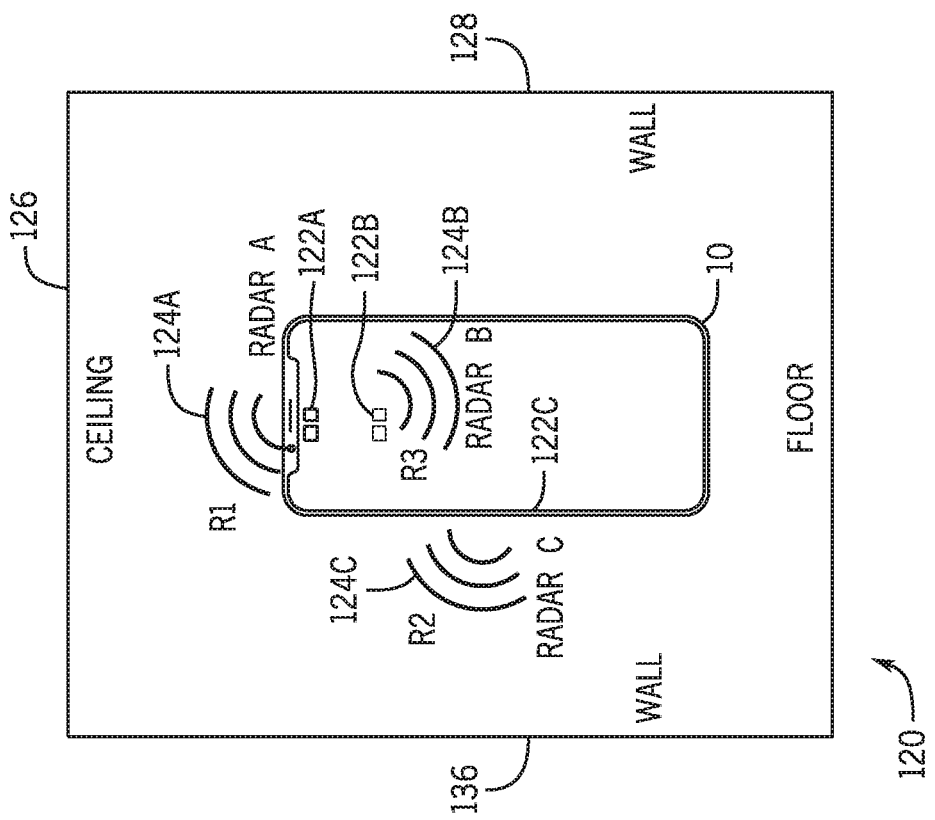
FIG. 8 is a diagram of the electronic device 10 of FIG. 1 in an indoor setting using the mapping circuitry, in accordance with an embodiment.

FIG. 8 illustrates a diagram of the electronic device 10 in an indoor setting 120. In the illustrated embodiment of the electronic device 10, the electronic device 10 includes three RADAR sensors 122, individually referred to a RADAR sensors 122A, 122B, and 122C. The RADAR sensor 122A is located at a top of the electronic device 10, the RADAR sensor 122B is located at a back of the electronic device 10, and the RADAR sensor 122B is located at a front of the electronic device 10. In some embodiments, more or fewer RADAR sensors 122 may be included in the electronic device 10 and/or the RADAR sensors 122 may be located in different positions on/within the electronic device 10. Each of the RADAR sensors 122 transmits and/or receives respective ranging signals 124. Specifically, the RADAR sensor 122A transmits and/or receives ranging signals 124A, the RADAR sensor 122B transmits and/or receives ranging signals 124B, and the RADAR sensor 122C transmits and/or receives ranging signals 124C. In the illustrated orientation of the electronic device 10, the ranging signals 124A are transmitted from the electronic device 10, reflect from a ceiling 126, and may be used to determine a distance between the electronic device 10 and the ceiling 126. This reflection may indicate the presence of the ceiling 126 above the electronic device 10. Similarly, the ranging signals 124B are transmitted from the electronic device 10, reflect from a wall 128 next to the electronic device 10, and may be used to determine a distance between the electronic device 10 and the wall 128 and/or a presence of the wall 128 next to the electronic device 10. Similarly, the ranging signals 124C are transmitted from the electronic device 10, reflect from a wall 136 next to the electronic device 10, and may be used to determine a distance between the electronic device 10 and the wall 136 and/or a presence of the wall 136 next to the electronic device 10.

Figure 9:
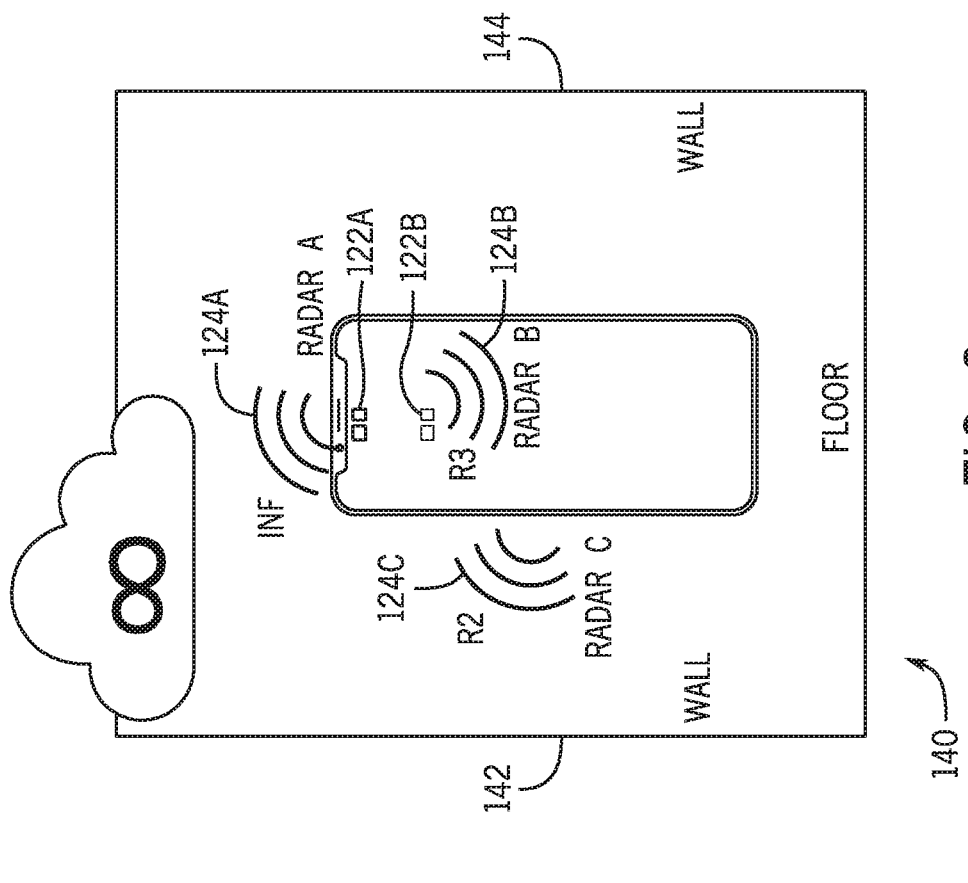
FIG. 9 is a diagram of the electronic device 10 of FIG. 1 in an outdoor setting using the mapping circuitry, in accordance with an embodiment.

In an outdoor setting 140 illustrated in FIG. 9, the ranging signals 124A are not reflected from a ceiling causing the electronic device 10 to not receive reflections having a power amplitude above the threshold (e.g., no reflected signals). In the illustrated example, the outdoor setting 140 may be between the walls 128 and 136 (e.g., between buildings in a street or alley) with respective walls 142 and 144 located next to the electronic device 10. However, in some embodiments, the outdoor setting may include fewer or more walls located adjacent to the electronic device 10.

Figure 10:
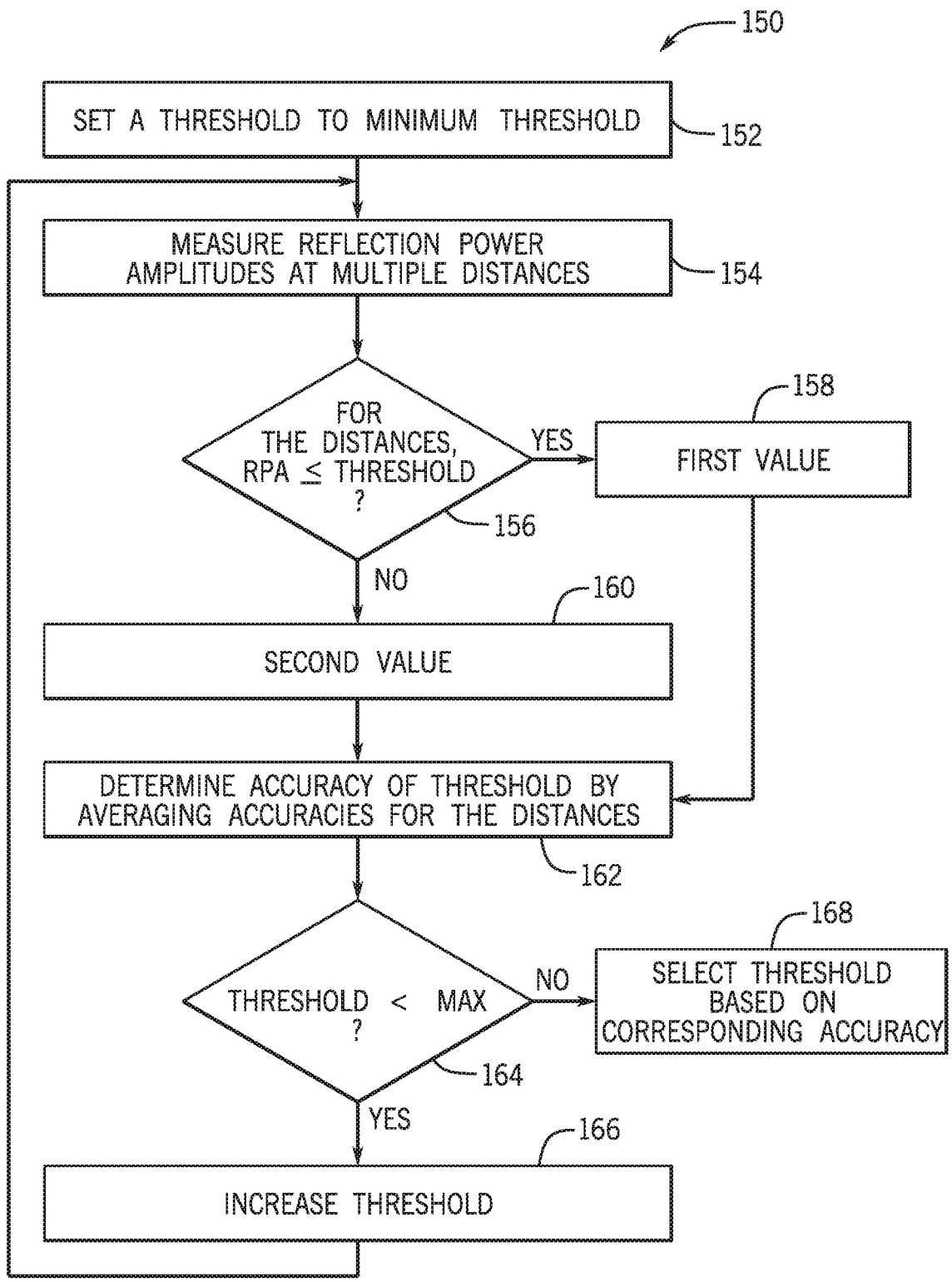
FIG. 10 is a block diagram of a process that may be used to set a threshold for an indoor prediction, in accordance with an embodiment.

FIG. 10 illustrates a flowchart diagram of a threshold-setting process 150 that may be used to set and/or determine the threshold to be used for an indoor/outdoor determination using the ranging signals 124. As illustrated, the threshold-setting process 150 includes the mapping circuitry 28 setting the threshold to a minimum threshold value (block 152). The minimum threshold value may correspond to a minimum threshold to begin testing. For example, this minimum threshold may be set to 0 or to an ambient level of received power at a respective RADAR sensor 122 before corresponding ranging signals 124 are transmitted. The mapping circuitry 28 then measures reflection power amplitudes (RPA) of the reflected ranging signals 124 at multiple distances (block 154). The RPAs may be tracked as a function of distance and/or time of duration of the ranging scan. As previously noted, this measurement may include a suitable power measurement technique, such as a square root of a sum of the squares of a in-phase power and a quadrature-phase power. For the multiple distances, the mapping circuitry 28 determines whether the RPA is greater than or equal to the threshold (block 156). If the RPA is greater than or equal to the threshold, mapping circuitry 28 may predict that the electronic device 10 is indoors for a particular distance. Based on the multiple distances, the mapping circuitry 28 may store information in separate bins that are then checked for accuracy in the indoor/outdoor determination.

When the mapping circuitry 28 predicts that the electronic device 10 is indoors, the mapping circuitry 28 may assign the distance and/or bin a first value (block 158). The first value (e.g., 1) is indicative that the electronic device 10 is indoors. If the mapping circuitry 28 does not predict that the electronic device 10 is indoors, the electronic device 10 may assign the distance and/or bin a second value (block 160). The second value (e.g., 0) is indicative that the electronic device 10 is outdoors.

The mapping circuitry 28 compares the predicted values to actual conditions to determine an accuracy of the threshold by averaging accuracies for the multiple distances (block 162). As previously noted, the actual conditions may be manually input, detected one or more other input structures 22 (e.g., a camera) of the electronic device 10, location-based determinations, and/or other factors. The mapping circuitry 28 determine the overall accuracy by averaging the accuracy of the predictions for each of the bins together to determine an overall accuracy.

Figure 11:
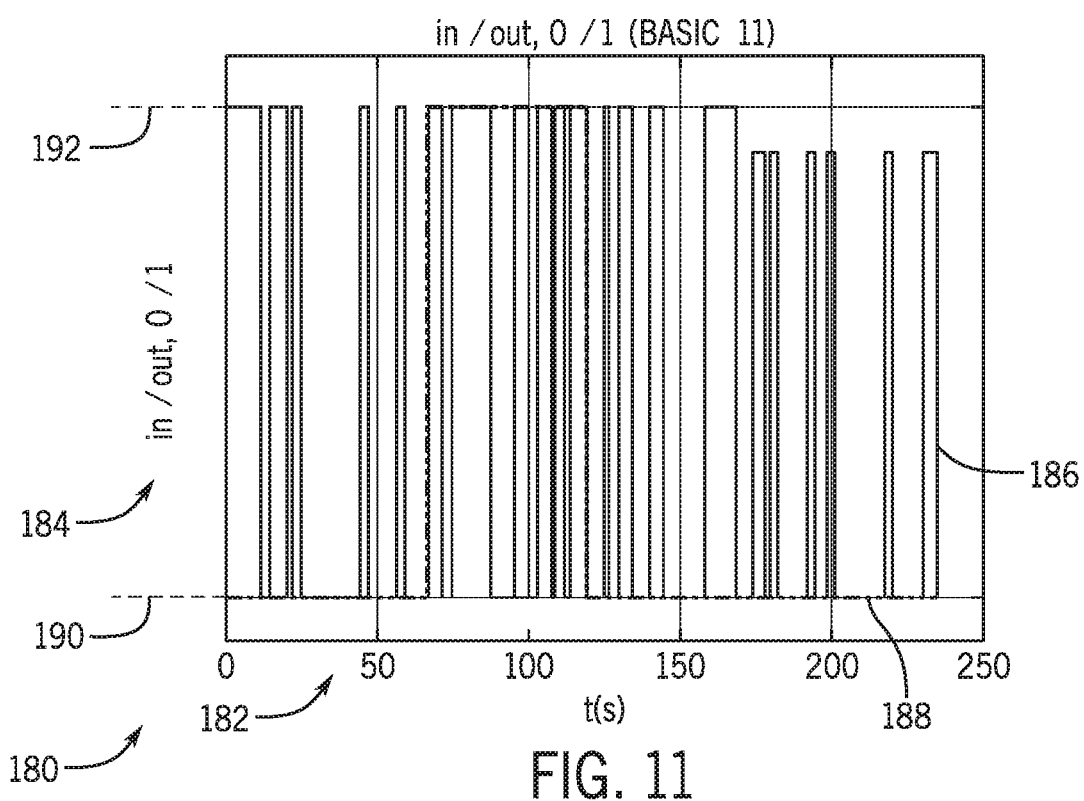
FIG. 11 is a graph illustrating an accuracy of predictions using the threshold of FIG. 10, in accordance with an embodiment.

FIG. 11 illustrates a graph 180 of a comparison of the estimated indoor/outdoor status and an actual status. The graph 180 occurs over time, as indicated by a time axis 182. The graph 180 indicates predictions 186, as indicated by axis 184, to an indoor status 188 of the electronic device 10. As previously discussed, the indoor status 188 may be derived from user input, location services, a camera of the device maintained in a direction where the camera may view potential ceiling locations, and/or any other suitable determinations. For example, the predictions 186 and the indoor status 188 may have a value of the first value 190 or the second value 192. When the prediction 186 and the indoor status 188 are equal, a number of correct predictions may be incremented. The number of correct predictions may be divided by the total number of predictions to derive an overall accuracy of the threshold used in the determination.

Returning to FIG. 10, the mapping circuitry 28 determines whether a currently measured threshold is a maximum threshold for the mapping circuitry 28 (block 164). If not, the mapping circuitry 28 increases the threshold to another threshold value (block 166) and returns to block 154 to test the new threshold. Once the mapping circuitry 28 determines that the maximum threshold has been reached, the mapping circuitry 28 uses a threshold from tested thresholds based on a corresponding accuracy measurement of the corresponding threshold (block 168). For instance, the mapping circuitry 28 may select the threshold that has the highest accuracy. Additionally or alternatively, the mapping circuitry 28 may stop scanning through potential threshold levels once a particular accuracy threshold has been achieved.

Figure 12:
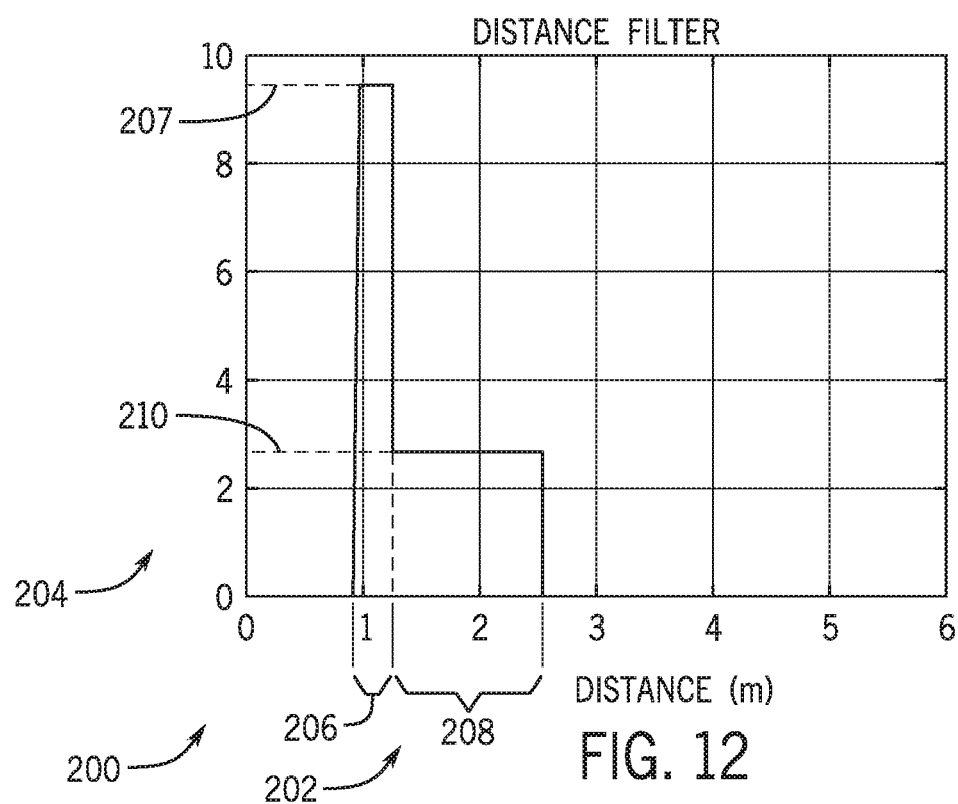
FIG. 12 is a graph illustrating a distance filter that may be used in determining an accuracy for the threshold of FIG. 10, in accordance with an embodiment.

Ceilings may have a general expected distance above the electronic device 10. For example, a typical ceiling may be located around 1 meter (e.g., 0.75 m to 1.25 m) above the electronic device 10. To take advantage of this aspect, the mapping circuitry 28 may improve accuracy of the thresholding by weighting the averaging in block 162 to more heavily weight expected distances where the ceiling may be located. For instance, FIG. 12 illustrates a graph 200 that corresponds to a distance filter and plots distances 202 versus an amplitude 204 used to weight the distances/bins. For example, in a region 206 that corresponds to a height at which a ceiling may be expected, the accuracies of the distances/bins may be weighted by a first factor 207 that amplifies the effects that the ranging signals 124 in the region 206 have on the overall accuracy. In a region 208 corresponding to distances (e.g., distances of 1.25 m-2.5 m) with a smaller chance of a ceiling being located, the mapping circuitry 28 may apply a lower level 210 of weighting that still amplifies corresponding distances where a ceiling may be found even though the amplification may be less than the amplification of the region 206. Furthermore, in some embodiments, distances beyond the distance corresponding to the region 208 may have their effect on the overall accuracy reduced (e.g., weight to 0) since ceilings are unlikely to be located at such distances, and the signals may be attributed to long-range noisy reflections. Similarly, distances closer than an expected ceiling distance may be ignored or reduced since such reflections may be attributed to reflections from a user or other objects closer than a ceiling may be located.

Figure 13:
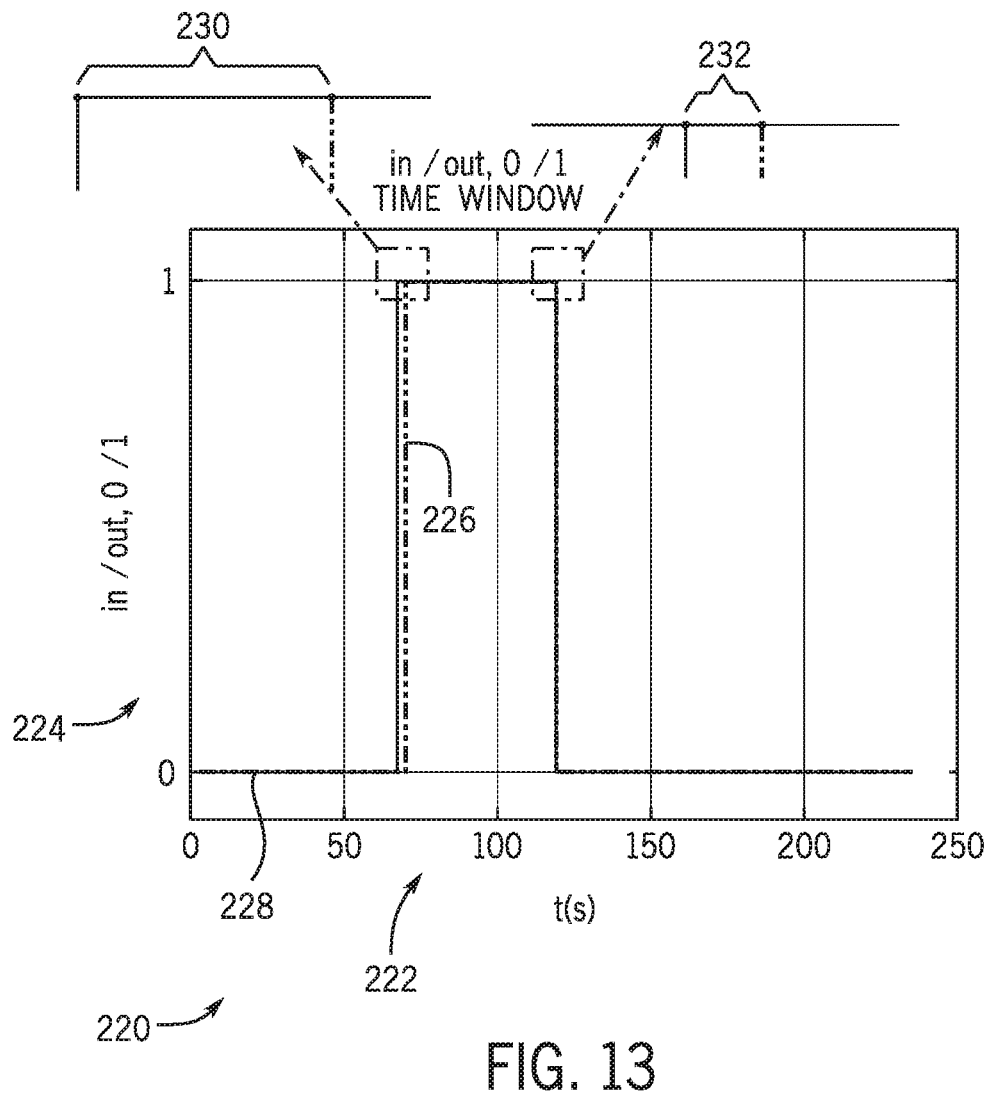
FIG. 13 is a graph illustrating a sliding window technique used to average predictions for multiple frames using the threshold of FIG. 10, in accordance with an embodiment.

Furthermore, in some embodiments, the ranging signals 124 may be captured relatively rapidly (e.g., 17 frames/second up to 4,000 frames/second). With such an abundance of data points, the electronic device 10 may take multiple frames from the reflection circuitry 32 and average the results in the time domain to reduce false classifications of spurious cases due to jitter in the range data. For instance, FIG. 13 illustrates a graph 220 that plots time 222 versus indications 224 of whether the electronic device 10 is indoor or outdoor. As illustrated, using an averaging between multiple frames for a specific threshold may increase accuracy of the indoor/outdoor prediction. For instance, in the illustrated embodiment, a prediction 226 closely follows an indoor status 228. The averaging of frames may reduce responsiveness of the prediction 226 in exchange for enhanced accuracy. For example, when the indoor status 228 transitions high, the prediction 226 trails the transition by an amount 230. Similarly, when the indoor status 228 transitions low, the prediction 226 trails the transition by an amount 232. However, due to the rate of frames being relatively faster than movement of a user with the electronic device 10, the amount 230 and 232 may be relatively small compared to the movement of the user. Accordingly, the tradeoff may have little impact on the overall accuracy of the prediction 226.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
    transmitting wireless signals from an electronic device in a direction corresponding to an expected ceiling location;
    receiving reflections of the wireless signals at the electronic device;
    detecting a ceiling based on whether a power amplitude of the reflections is greater than or equal to a threshold value;
    operating the electronic device in an outdoor mode if the power amplitude of the reflections is not greater than or equal to the threshold value; and
    operating the electronic device in an indoor mode if the power amplitude of the reflections is greater than or equal to the threshold value.

2. The method of claim 1, wherein transmitting the wireless signals in the direction corresponding to an expected ceiling location comprises transmitting the wireless signals in an upward direction from the electronic device.

3. The method of claim 2, wherein the wireless signals comprise radio detection and ranging signals.

4. The method of claim 2, comprising detecting an orientation of the electronic device to determine which direction is the upward direction.

5. The method of claim 1, wherein transmitting the wireless signals from the electronic device comprises broadcasting from multiple directions using multiple transmitters located at multiple locations in or on the electronic device.

6. The method of claim 1, wherein the outdoor mode comprises:
    initiating calibration of a barometer of the electronic device; or
    detecting an altitude of the electronic device using outdoor settings and the barometer.

7. The method of claim 1, wherein the outdoor mode comprises activating global positioning detection.

8. The method of claim 1, wherein the outdoor mode comprises deactivating a WiFi network connection and switching to a cellular data connection for data transfers.

9. The method of claim 1, comprising setting the threshold value using empirical testing of a plurality of thresholds.

10. The method of claim 9, wherein setting the threshold value comprises:
    setting a testing threshold to a minimum threshold; and
    for each threshold of the plurality of thresholds:
        measuring reflection power at multiple distances;
        estimating whether the electronic device is indoors or outdoors based on the respective threshold for each of the multiple distances;
        comparing the estimates to indoor statuses of the multiple distances;
        determining an accuracy of the testing threshold based on the comparison of the estimates to the indoor statuses; and
        incrementing the testing threshold to a next threshold of the plurality of thresholds; and
    selecting the threshold from the plurality of thresholds based at least in part on the accuracies of the plurality of thresholds.

11. The method of claim 10, wherein measuring reflection power at the multiple distances comprises organizing the multiple distances into a plurality of bins, determining the accuracy comprises determining bin accuracies for each bin and averaging the bin accuracies together.

12. The method of claim 11, wherein averaging the bin accuracies together comprises weighting distances in the averaging.

13. The method of claim 12, wherein distances corresponding to common ceiling distances are weighted more heavily than other distances.

14. The method of claim 10, wherein selecting the threshold from the plurality of thresholds based at least in part on the accuracies of the plurality of thresholds comprises selecting the threshold as corresponding to a highest accuracy for the plurality of thresholds.

15. The method of claim 10, wherein measuring reflection power at multiple distances comprises combining multiple measurements from within a sliding time window.

16. An electronic device, comprising:
one or more antennas; and
mapping circuitry configured to:
set a testing threshold to a first value for power amplitudes of received reflected wireless signals received at the one or more antennas, wherein the testing threshold is configured to indicate whether an electronic device is indoors based on a determination of a presence of a ceiling above the electronic device based on the power amplitudes of the received reflected signals;
measure the power amplitudes at one or more distances;
estimate whether the electronic device is indoors based at least in part on the power amplitudes of the received reflected wireless signals and the testing threshold for the one or more distances;
determine whether the estimate is accurate for the one or more distances as one or more accuracies;
assign a combined accuracy for the first value by averaging the one or more accuracies;
determine combined accuracies for one or more additional threshold values;
select a threshold value from the first value and the one or more additional threshold values based on the respective combined accuracies;
determine whether the electronic device is indoors based at least in part on the threshold value;
operate the electronic device in an indoor mode based at least in part on a determination that the power amplitudes of the received reflected signals are greater than or equal to the selected thresholds; and
operate the electronic device in an outdoor mode based at least in part on a determination that the power amplitudes of the received reflected signals are not greater than or equal to the selected thresholds.

17. The electronic device of claim 16, wherein determining whether the electronic device is indoors comprises determining that the electronic device is indoors when subsequent received reflected wireless signals that are received after the received reflected wireless signals have a lower power amplitude than the threshold value.

18. The electronic device of claim 16, comprising a barometer, wherein the mapping circuitry is configured to initiate a calibration of the barometer based at least in part on a determination that the electronic device is not indoors.

19. The electronic device of claim 16, comprising a barometer, wherein the mapping circuitry is configured to detect an altitude of the electronic device based at least in part on a determination that the electronic device is not indoors.

20. Tangible, non-transitory, and computer-readable medium having instructions stored thereon that, when executed by a processor, are configured to cause the processor to:
compare a strength of received reflected wireless signals to a respective threshold for each of a plurality of thresholds;
estimate that an electronic device is indoors when the strength of the received reflected wireless signals is greater than or equal to the respective threshold for each of the plurality of thresholds;
determine accuracy of the estimation as a function of variance between an indoor status of the electronic device in comparison with the estimation that the electronic device is indoors for each of the plurality of thresholds;
select a selected threshold from the plurality of thresholds based at least in part on respective accuracies of the plurality of thresholds;
determine whether subsequent reflected signals are greater than or equal to the selected threshold;
operate the electronic device in an indoor mode based at least in part on a determination that the subsequent reflected signals are greater than or equal to the selected thresholds; and
operate the electronic device in an outdoor mode based at least in part on a determination that the subsequent reflected signals are not greater than or equal to the selected thresholds.

* * * * *